(12) United States Patent
Li et al.

(10) Patent No.: US 10,897,779 B2
(45) Date of Patent: Jan. 19, 2021

(54) HARQ-ACK INFORMATION TRANSMISSION METHOD AND APPARATUS

(71) Applicant: ZTE CORPORATION, Guangdong (CN)

(72) Inventors: Xincai Li, Shenzhen (CN); Wei Gou, Shenzhen (CN); Yajun Zhao, Shenzhen (CN); Focai Peng, Shenzhen (CN); Ling Yang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 12 days.

(21) Appl. No.: 16/097,395

(22) PCT Filed: Apr. 28, 2017

(86) PCT No.: PCT/CN2017/082528
§ 371 (c)(1),
(2) Date: Oct. 29, 2018

(87) PCT Pub. No.: WO2017/186174
PCT Pub. Date: Nov. 2, 2017

(65) Prior Publication Data
US 2019/0159251 A1  May 23, 2019

(30) Foreign Application Priority Data

Apr. 29, 2016  (CN) .......................... 2016 1 0281802

(51) Int. Cl.
*H04L 12/413* (2006.01)
*H04W 74/08* (2009.01)
(Continued)

(52) U.S. Cl.
CPC ........... *H04W 74/0808* (2013.01); *H04L 1/18* (2013.01); *H04L 1/1812* (2013.01);
(Continued)

(58) Field of Classification Search
USPC ....... 370/216, 242, 252, 328, 329, 330, 343, 370/345, 445, 446, 447, 458, 461, 462,
(Continued)

(56) References Cited

U.S. PATENT DOCUMENTS

2016/0212734 A1* 7/2016 He ............................ H04L 5/14
2017/0126365 A1* 5/2017 Peng ..................... H04L 1/1861
(Continued)

FOREIGN PATENT DOCUMENTS

| CN | 105187173 A | 12/2015 |
|---|---|---|
| CN | 105338568 A | 2/2016 |

(Continued)

OTHER PUBLICATIONS

International Search Report and Written Opinion for International Appl. No. PCT/CN2017/082528, dated Jun. 28, 2017.

*Primary Examiner* — Nguyen H Ngo
(74) *Attorney, Agent, or Firm* — Foley & Lardner LLP

(57) ABSTRACT

Provided are an HARQ-ACK information transmission method and apparatus. The method includes: determining the HARQ-ACK to be transmitted and a resource location on an unlicensed carrier for transmitting the HARQ-ACK according to a predefinition or a signaling indication, performing a listen before talk (LBT) procedure on the unlicensed carrier, and transmitting the HARQ-ACK on the resource location after the LBT procedure is successfully performed.

17 Claims, 4 Drawing Sheets

(51) Int. Cl.
*H04L 1/18* (2006.01)
*H04L 5/00* (2006.01)
(52) U.S. Cl.
CPC .......... *H04L 1/1864* (2013.01); *H04L 1/1896* (2013.01); *H04L 5/0055* (2013.01)
(58) Field of Classification Search
USPC ........................................................ 370/468
See application file for complete search history.

(56) References Cited

U.S. PATENT DOCUMENTS

| | | | |
|---|---|---|---|
| 2017/0280430 A1* | 9/2017 | Yin | H04W 76/16 |
| 2018/0027549 A1* | 1/2018 | Wang | H04L 1/0025 370/329 |
| 2018/0102880 A1* | 4/2018 | Xu | H04W 72/048 |
| 2018/0175973 A1* | 6/2018 | Rosa | H04L 1/1812 |
| 2019/0313450 A1* | 10/2019 | Mukherjee | H04W 72/0453 |

FOREIGN PATENT DOCUMENTS

| | | |
|---|---|---|
| CN | 105453473 A | 3/2016 |
| CN | 105474567 A | 4/2016 |

\* cited by examiner

HARQ-ACK INFORMATION TRANSMISSION METHOD AND APPARATUS

CROSS REFERENCE TO RELATED APPLICATION

This is a National Stage Application, filed under 37 U.S.C. 371 of International Patent Application No. PCT/CN2017/082528, filed on Apr. 28, 2017, which claims priority to Chinese Patent Application No. 201610281802.3 filed on Apr. 29, 2016, contents of both of which are incorporated herein by reference in their entireties.

TECHNICAL FIELD

The present disclosure relates to the field of communications and, in particular, to a Hybrid Automatic Repeat reQuest-Acknowledgement (HARQ-ACK) information transmission method and apparatus.

BACKGROUND

A Long-Term Evolution (LTE) system uses an unlicensed carrier, which is important in an LTE evolution process. The technology will enable the LTE system to use an existing unlicensed carrier and greatly enhance potential spectrum resources for the LTE system so that the LTE system can achieve lower spectrum costs.

The LTE uses the unlicensed carrier in two main modes: one is carrier aggregation (CA) where the unlicensed carrier is accessed as an auxiliary component carrier; and the other one is a dual connectivity (DC) access mode.

Since the unlicensed carrier introduces a listen before talk (LBT) mechanism, when a terminal, such as a user equipment (UE), feeds back an acknowledgment or a non-acknowledgement (ACK/NACK) on the unlicensed carrier, an existing timing relationship between a physical downlink shared channel (PDSCH) and a Hybrid Automatic Repeat Request-Acknowledgement (HARQ-ACK) may not be guaranteed or feedback efficiency of the HARQ-ACK is relatively low. Moreover, since different frame structures are used for data transmission on the unlicensed carrier and a licensed carrier, both the timing between the HARQ-ACK and the PDSCH and the transmission of the HARQ-ACK need to be reconsidered. Therefore, there is a problem in the existing art of a relatively low transmission probability and feedback efficiency of the HARQ-ACK.

No effective solution has yet been proposed for the above problem.

SUMMARY

Embodiments of the present disclosure provide the HARQ-ACK information transmission method and apparatus to solve at least the problem in the existing art of a relatively low transmission probability and feedback efficiency of the HARQ-ACK information.

An embodiment of the present disclosure provides the HARQ-ACK information transmission method, including: determining the HARQ-ACK information to be transmitted and a resource location on an unlicensed carrier for transmitting the HARQ-ACK information according to a predefinition or a signaling indication; performing the LBT procedure on the unlicensed carrier; and transmitting the HARQ-ACK information on the resource location after the LBT procedure is successfully performed.

In an exemplary embodiment, the signaling indication includes at least one of: a carrier indication for feeding back the HARQ-ACK information; a frequency domain resource location for transmitting the HARQ-ACK information; a sub-frame position or a sub-frame set for feeding back an acknowledgement or a non-acknowledgement (ACK/NACK); a process number or a process group number of the HARQ of a physical downlink shared channel (PDSCH) that requires feedback of the ACK/NACK; a signaling indication for indicating a capability of delaying sending the HARQ-ACK information; delay time for sending the HARQ-ACK information; a size of a predefined transmission window of the ACK/NACK; a size of a sliding window of the PDSCH in a plurality of transmission units corresponding to the feedback of the HARQ-ACK information, where the sliding window includes a predetermined number of consecutive downlink transmission units with variable positions; sliding granularity of the sliding window of the PDSCH in the plurality of transmission units corresponding to the feedback of the HARQ-ACK information; an adjustment size of the sliding window of the PDSCH in the plurality of transmission units corresponding to the feedback of the HARQ-ACK information; or a size of the HARQ-ACK information.

In an exemplary embodiment, the HARQ-ACK information includes an acknowledgement or a non-acknowledgement (ACK/NACK) corresponding to at least one transmission unit, where the ACK/NACK corresponding to the at least one transmission unit includes at least one of: an ACK/NACK of a physical downlink shared channel (PDSCH) corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time.

In an exemplary embodiment, the transmission unit includes one of: at least one sub-frame, at least one time slot, or at least one orthogonal frequency division multiplexing (OFDM) symbol.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the determining the HARQ-ACK information to be transmitted and the resource location for transmitting the HARQ-ACK information according to the signaling indication includes: obtaining signaling indication carried in a received radio resource control (RRC) message and/or received downlink control information (DCI) signaling indication; and determining the HARQ-ACK information to be transmitted and the resource location for transmitting the HARQ-ACK information according to the obtained signaling indication.

In an exemplary embodiment, the obtaining the signaling indication carried in the received DCI signaling indication includes: obtaining signaling indication carried in the received DCI signaling, where the DCI signaling indication includes at least one of a downlink (DL) grant, a public information indication, an uplink (UL) grant, or a group-user equipment (Group-UE) DCI indication.

In an exemplary embodiment, when the HARQ-ACK information includes an acknowledgement or a non-acknowledgement (ACK/NACK) corresponding to all transmission units of a physical downlink shared channel (PDSCH) in a time window, sliding a sliding window of a PDSCH corresponding to feedback of the HARQ-ACK information according to a sliding granularity indicated by the signaling or a granularity of one time window length or a granularity of one sliding window length or granularity of K transmission units, where K is a positive integer.

In an exemplary embodiment, a time domain resource location for transmitting the HARQ-ACK information includes one of: a location of a first uplink transmission unit after a downlink burst; a location indicated by the signaling; a location determined by adding Q transmission units to a location of a transmission unit of a last physical downlink shared channel (PDSCH), where Q is a predefined value or a value configured by the signaling; or a location determined by adding the Q transmission units to a location of a last transmission unit in a sliding window of the PDSCH, where Q is the predefined value or the value configured by the signaling.

In an exemplary embodiment, a frequency domain resource location for transmitting the HARQ-ACK information is determined by at least one of: determining, according to a physical resource block (PRB) location indicated by the signaling, a frequency domain resource location for transmitting the HARQ-ACK information; determining, according to a relationship between an interleaving unit and a control channel element (CCE) index of a control channel corresponding to a physical downlink shared channel (PDSCH), the frequency domain resource location for transmitting the HARQ-ACK information; or determining, according to a transmit power control (TPC) command or allocated resource index (ARI) signaling in downlink control information of a secondary cell (Scell), the frequency domain resource for transmitting the HARQ-ACK information after a frequency domain resource set configured semi-statically by higher layer signaling is determined.

In an exemplary embodiment, physical resource blocks (PRBs) included in the interleaving unit are uniformly and discretely distributed within a system bandwidth; and/or the same interleaving unit is code-division or time-division multiplexed by different user equipments (UEs).

In an exemplary embodiment, when the HARQ-ACK information includes HARQ-ACK information corresponding to a plurality of transmission units on one carrier, the HARQ-ACK information is determined by at least one of: a size of a sliding window of a physical downlink shared channel (PDSCH) in a plurality of transmission units corresponding to feedback of the HARQ-ACK information; a number of PDSCHs corresponding to a user equipment (UE) received in the sliding window of the PDSCH in the plurality of transmission units corresponding to the feedback of the HARQ-ACK information; a value of a last downlink assignment index (DAI) received in the sliding window of the PDSCH in the plurality of transmission units corresponding to the feedback of the HARQ-ACK information; a value of a last DAI received; a number of PDSCHs corresponding to the UE and being included in a previous downlink burst; or a size of the HARQ-ACK information indicated by the signaling.

In an exemplary embodiment, when the HARQ-ACK information includes HARQ-ACK information of all carriers in an uplink control information (UCI) cell group, the transmitting the HARQ-ACK information on the resource location includes: concatenating HARQ-ACK information of all the carriers in a predetermined order; and transmitting the concatenated HARQ-ACK information of all the carriers on the resource location.

In an exemplary embodiment, the transmitting the HARQ-ACK information on the resource location includes: transmitting, on the resource location, the HARQ-ACK information and at least one of: process number information of a physical downlink shared channel (PDSCH) corresponding to the HARQ-ACK information, or offset information of a predetermined time domain resource location or a time domain resource location indicated by the signaling from the resource location.

In an exemplary embodiment, the determining the resource location for transmitting the HARQ-ACK information according to the signaling indication includes: determining the resource location for transmitting the HARQ-ACK information via a first signaling and a second signaling; where the first signaling is used for indicating at least one of: scheduling information for transmitting the HARQ-ACK information, a size of a frequency domain resource, a window size of a PDSCH that requires feedback, or a size of an acknowledgment or a non-acknowledgment (ACK/NACK); and the second signaling is used for indicating a time domain location and/or a resource location of a physical resource block (PRB) for transmitting the HARQ-ACK information.

In an exemplary embodiment, after the performing the LBT procedure on the unlicensed carrier, the method further includes: transmitting the HARQ-ACK information by using a nearest transmission unit on a licensed carrier included in a predetermined cell group or abandoning transmission of the HARQ-ACK information when the LBT procedure is unsuccessfully performed on a predefined location of the unlicensed carrier or a feedback location indicated by the signaling; or feeding back failure information of the LTB procedure on a predefined licensed carrier when the LBT procedure is unsuccessfully performed on the predefined location or the feedback location indicated by the signaling on the unlicensed carrier, and all the HARQ-ACK information is an ACK or a number of the ACK in the HARQ-ACK information exceeds a threshold.

In an exemplary embodiment, the transmitting the HARQ-ACK information by using the nearest transmission unit on the licensed carrier included in the predetermined cell group includes: transmitting the HARQ-ACK information by using a nearest transmission unit periodically reserved on the licensed carrier included in the predetermined cell group.

Another embodiment of the present disclosure provides the HARQ-ACK information transmission method, including: transmitting a signaling indication to the UE; where the signaling indication is used for indicating relevant information of the HARQ-ACK information transmitted by the UE and a resource location on an unlicensed carrier for transmitting the HARQ-ACK information by the UE.

In an exemplary embodiment, the signaling indication includes at least one of: a carrier indication for feeding back the HARQ-ACK information; a frequency domain resource location for transmitting the HARQ-ACK information; a sub-frame position or a sub-frame set for feeding back an acknowledgement or a non-acknowledgement (ACK/NACK); a process number or a process group number of the HARQ of a physical downlink shared channel (PDSCH) that requires feedback of the ACK/NACK; a signaling indication for indicating a capability of delaying sending the HARQ-ACK information; delay time for sending the HARQ-ACK information; a size of a predefined transmission window of the ACK/NACK; a size of a sliding window of the PDSCH in a plurality of transmission units corresponding to the feedback of the HARQ-ACK information, where the sliding window includes a predetermined number of consecutive downlink transmission units with variable positions; sliding granularity of the sliding window of the PDSCH in the plurality of transmission units corresponding to the feedback of the HARQ-ACK information; an adjustment size of the sliding window of the PDSCH in the plurality of transmission units corresponding to the feedback of the HARQ-ACK information; or a size of the HARQ-ACK information.

In an exemplary embodiment, the HARQ-ACK information includes the ACK/NACK corresponding to at least one transmission unit, where the ACK/NACK corresponding to the at least one transmission unit includes at least one of: an ACK/NACK of the PDSCH corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time.

In an exemplary embodiment, the transmission unit includes one of: at least one sub-frame, at least one time slot, or at least one orthogonal frequency division multiplexing (OFDM) symbol.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the transmitting the signaling indication to the UE includes: carrying the signaling indication in a radio resource control (RRC) message and/or downlink control information (DCI) signaling indication; and transmitting the RRC message and/or DCI signaling indication carrying the signaling indication to the UE.

In an exemplary embodiment, the carrying the signaling indication in the DCI signaling indication includes: carrying the signaling indication in the DCI signaling indication, where the DCI signaling indication includes at least one of a downlink (DL) grant, a public information indication, an uplink (UL) grant, or a group-user equipment (Group-UE) DCI indication.

In an exemplary embodiment, before the transmitting the signaling indication to the UE, the method further includes: semi-statically configuring, for the UE, a frequency domain resource set for transmitting the HARQ-ACK information; where the DCI signaling indication is used for indicating, from the frequency domain resource set, a frequency domain resource used by the UE for transmitting the HARQ-ACK information.

In an exemplary embodiment, the transmitting the signaling indication to the UE includes: transmitting a first signaling and a second signaling to the UE; where the first signaling is used for indicating at least one of: scheduling information used by the UE for transmitting the HARQ-ACK information, a size of a frequency domain resource, a window size of a PDACH that requires feedback, or a size of an acknowledgment or a non-acknowledgment (ACK/NACK), and the second signaling is used for indicating a time domain location and/or a resource location of a physical resource block (PRB) used by the UE for transmitting the HARQ-ACK information.

Another embodiment of the present embodiment provides a Hybrid Automatic Repeat reQuest-Acknowledgement (HARQ-ACK) information transmission apparatus, including: a determining module, which is configured to determine the HARQ-ACK information to be transmitted and a resource location on an unlicensed carrier for transmitting the HARQ-ACK information according to a predefinition or a signaling indication; an performing module, which is configured to perform a listen before talk (LBT) procedure on the unlicensed carrier; and a first transmitting module, which is configured to transmit the HARQ-ACK information on the resource location after the LBT procedure is successfully performed.

Another embodiment of the present embodiment provides a Hybrid Automatic Repeat reQuest-Acknowledgement (HARQ-ACK) information transmission apparatus, including: a second transmitting module, which is configured to transmit signaling indication to a user equipment (UE); where the signaling indication is used for indicating relevant information of the HARQ-ACK information transmitted by the UE and a resource location on an unlicensed carrier for transmitting the HARQ-ACK information by the UE.

Another embodiment of the present disclosure provides a non-transitory storage medium. The non-transitory storage medium includes a stored program which, when executed, executes the method of any one of the embodiments described above.

Another embodiment of the present disclosure provides a processor. The processor is used for executing a program, which, when executed, executes the method of any one of the embodiments described above.

In the present disclosure, the HARQ-ACK information to be transmitted and the resource location are determined according to the predefinition or the signaling indication, thereby addressing impacts of a new frame structure and the LBT on the transmission of an original timing relationship, improving a transmission probability and feedback flexibility of the HARQ-ACK information and effectively improving system performance.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in any improper way. In the accompanying drawings.

DETAILED DESCRIPTION

The present disclosure will be described hereinafter in detail through embodiments with reference to the accompanying drawings. It is to be noted that if not in collision, the embodiments and features therein in the present application may be combined with each other.

It is to be noted that the terms "first", "second" and the like in the description, claims and above accompanying drawings of the present disclosure are used to distinguish between similar objects and are not necessarily used to describe a particular order or sequence.

Figure 1:
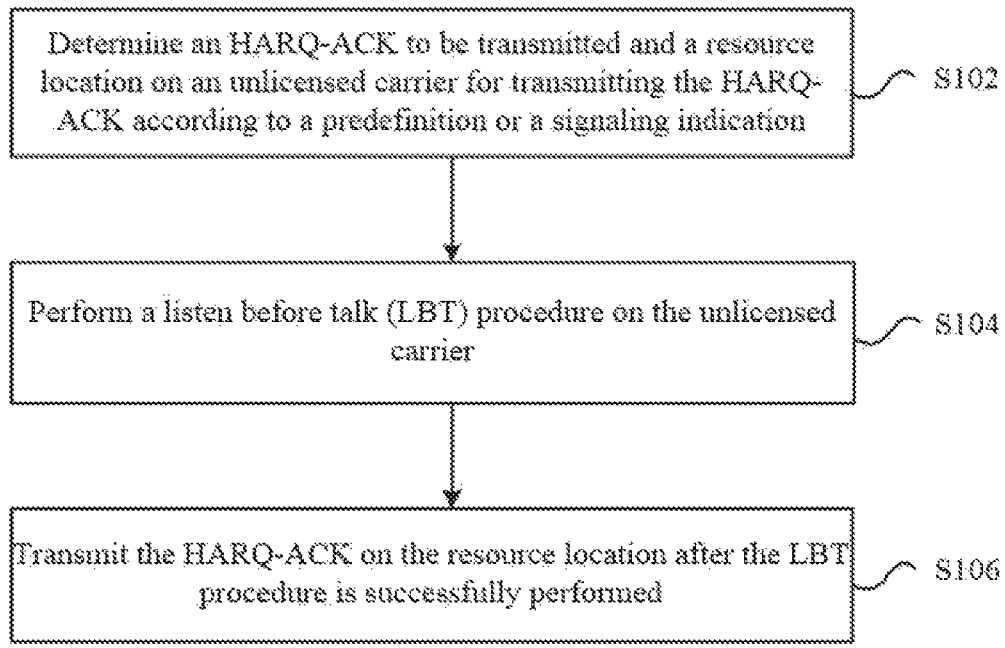
FIG. 1 is a first flowchart of an HARQ-ACK information transmission method according to an embodiment of the present disclosure.

An embodiment of the present disclosure provides an HARQ-ACK information (hereinafter referred to as HARQ-ACK) transmission method. FIG. 1 is a first flowchart of an HARQ-ACK transmission method according to an embodiment of the present disclosure. As shown in FIG. 1, the method includes the steps described below.

In step S012, the HARQ-ACK to be transmitted and a resource location on an unlicensed carrier for transmitting the HARQ-ACK are determined according to a predefinition or a signaling indication.

In step S104, a listen before talk (LBT) procedure is performed on the unlicensed carrier. In step S106, the HARQ-ACK is transmitted on the resource location after the LBT procedure is successfully performed.

The operations described above may be performed by a user equipment (UE).

In the above steps, the HARQ-ACK to be transmitted and the resource location for transmitting the HARQ-ACK may be determined according to the predefinition or the signaling indication so that the HARQ-ACK may be transmitted on the determined resource location, thereby addressing impacts of a new frame structure and the LBT procedure on the transmission of an original timing relationship, improving a transmission probability and feedback flexibility of the HARQ-ACK and effectively improving system performance.

In an exemplary embodiment, the signaling indication may include at least one of: a carrier indication for feeding back the HARQ-ACK; a frequency domain resource location for transmitting the HARQ-ACK; a sub-frame position or a sub-frame set for feeding back the ACK/NACK; a process number or a process group number of the HARQ of the PDSCH that requires feedback of the ACK/NACK; a signaling indication for indicating a capability of delaying sending the HARQ-ACK, that is, whether delaying sending the HARQ-ACK is allowed; delay time for sending the HARQ-ACK; a size of a predefined transmission window of the ACK/NACK; a size of a sliding window of the PDSCH in a plurality of transmission units corresponding to the feedback of the HARQ-ACK, where the sliding window includes a predetermined number of consecutive downlink transmission units with variable positions; a sliding granularity of the sliding window of the PDSCH in the plurality of transmission units corresponding to the feedback of the HARQ-ACK; an adjustment size of the sliding window of the PDSCH in the plurality of transmission units corresponding to the feedback of the HARQ-ACK; or a size of the HARQ-ACK. In the embodiment, the carrier indication for feeding back the HARQ-ACK may be used for indicating at least two carriers for feeding back the HARQ-ACK.

In an exemplary embodiment, the HARQ-ACK includes an ACK/NACK corresponding to at least one transmission unit. The ACK/NACK corresponding to the at least one transmission unit includes at least one of: an ACK/NACK of a PDSCH corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time. The HARQ-ACK according to the predefinition or the signaling indication is an HARQ-ACK to be fed back and to be obtained by the UE, and the UE may obtain and report the HARQ-ACK accordingly.

In an exemplary embodiment, the transmission unit may include one of: at least one sub-frame, at least one time slot, or at least one orthogonal frequency division multiplexing (OFDM) symbol. In the embodiment, when the transmission unit includes a plurality of OFDM symbols, a length of the plurality of OFDM symbols should be less than or equal to a length of one time window.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the step in which the HARQ-ACK to be transmitted and the resource location for transmitting the HARQ-ACK are determined according to the signaling indication includes: obtaining a signaling indication carried in a received radio resource control (RRC) message and/or received downlink control information (DCI) signaling indication; and determining the HARQ-ACK to be transmitted and the resource location for transmitting the HARQ-ACK according to the obtained signaling indication. In the embodiment, the signaling indication may be transmitted by a base station, and the base station may send the signaling indication via the RRC message or the DCI signaling indication. In an exemplary embodiment, the signaling indication may be used for indicating at least two carriers for feeding back the HARQ-ACK.

In an exemplary embodiment, the step of obtaining the signaling indication carried in the received DCI signaling indication includes: obtaining signaling indication carried in the received DCI signaling indication. The DCI signaling indication includes at least one of a downlink (DL) grant, a public information indication, an uplink (UL) grant, or a group-user equipment (Group-UE) DCI indication. In the embodiment, the signaling is carried in at least one of: the DL grant, the public information indication, the UL grant, or the Group-UE DCI indication.

In an exemplary embodiment, when the HARQ-ACK includes an acknowledgement or a non-acknowledgement (ACK/NACK) corresponding to all transmission units of the PDSCH in a time window, a sliding window of a PDSCH corresponding to feedback of the HARQ-ACK slides according to a sliding granularity indicated by the signaling or a granularity of one time window length or a granularity of one sliding window length or a granularity of K transmission units, where K is a positive integer. In the embodiment, a length of the K transmission units may be less than or equal to a length of a time window.

In an exemplary embodiment, a time domain resource location for transmitting the HARQ-ACK includes one of: a location of a first uplink transmission unit after a downlink burst; a location indicated by the signaling; a location determined by adding Q transmission units to a location of a transmission unit of a last physical downlink shared channel (PDSCH), where Q is a predefined value or a value configured by the signaling; and a location determined by adding the Q transmission units to a location of a last transmission unit in a sliding window of the PDSCH, where Q is the predefined value or the value configured by the signaling.

In an exemplary embodiment, a frequency domain resource location for transmitting the HARQ-ACK may be determined by at least one of: determining, according to a physical resource block (PRB) location indicated by the signaling, a frequency domain resource location for transmitting the HARQ-ACK; determining, according to a relationship between an interleaving unit and a control channel element (CCE) index of a control channel corresponding to a physical downlink shared channel (PDSCH), the frequency domain resource for transmit the HARQ-ACK; or determining, according to a transmit power control (TPC) command or allocated resource index (ARI) signaling in downlink control information (DCI) of a secondary cell (Scell), the frequency domain resource location for transmitting the HARQ-ACK after a frequency domain resource set configured semi-statically by higher layer signaling is determined.

In an exemplary embodiment, physical resource blocks (PRBs) included in the interleaving unit are uniformly and discretely distributed within a system bandwidth; and/or the same interleaving unit is code-division or time-division multiplexed by different user equipments (UEs). In an exemplary embodiment, the frequency domain resource may be uniformly and discretely distributed within the system bandwidth.

In an exemplary embodiment, when the HARQ-ACK includes an HARQ-ACK corresponding to a plurality of transmission units on one carrier, the HARQ-ACK may be determined by at least one of: a size of a sliding window of a physical downlink shared channel (PDSCH) in a plurality of transmission units corresponding to feedback of the HARQ-ACK (for example, the HARQ-ACK and the sliding window may have the same size); a number of PDSCHs corresponding to a user equipment (UE) received in the sliding window of the PDSCH in the plurality of transmission units corresponding to the feedback of the HARQ-ACK (for example, the HARQ-ACK may have a size equal to the number of PDSCHs corresponding to the UE); a value of a last downlink assignment index (DAI) received in the sliding window of the PDSCH in the plurality of transmission units corresponding to the feedback of the HARQ-ACK (for example, the HARQ-ACK may have a size equal to the value of the DAI); a value of a last DAI received (for example, the HARQ-ACK may have a size equal to the value of the DAD; a number of PDSCHs corresponding to the UE and being included in a previous downlink burst (for example, the HARQ-ACK may have a size equal to the number of PDSCHs corresponding to the UE); or a size of the HARQ-ACK indicated by the signaling (for example, the HARQ-ACK may have a size of the HARQ-ACK indicated by the signaling).

In an exemplary embodiment, when the HARQ-ACK includes an HARQ-ACK of all carriers in an uplink control information (UCI) cell group, the step in which the HARQ-ACK is transmitted on the resource location includes: concatenating the HARQ-ACK of all the carriers in a predetermined order; and transmitting the concatenated HARQ-ACK of all the carriers on the resource location. In the embodiment, the HARQ-ACK of all the carriers may be concatenated in an ascending order of a carrier index, or the HARQ-ACK of all the carriers may be concatenated in a descending order of the carrier index, or the HARQ-ACK of all the carriers may be concatenated in other carrier orders.

In an exemplary embodiment, the step in which the HARQ-ACK is transmitted on the resource location includes: transmitting, on the resource location, the HARQ-ACK and at least one of: process number information of a physical downlink shared channel (PDSCH) corresponding to the HARQ-ACK, or offset information of a predetermined time domain resource location or a time domain resource location indicated by the signaling from the resource location. That is, the process number information and the offset information are transmitted to the base station along with the HARQ-ACK. A specific transmission mode may be referred to an embodiment 11 described below.

In an exemplary embodiment, the step in which the resource location for transmitting the HARQ-ACK is determined according to the signaling indication includes: determining the resource location for transmitting the HARQ-ACK via two signalings: a first signaling is used for indicating at least one of: scheduling information for transmitting the HARQ-ACK, a size of a frequency domain resource (i.e., the size of the frequency domain resource for transmitting the HARQ-ACK), a window size of a PDSCH that requires feedback, or a size of an acknowledgment or a non-acknowledgment (ACK/NACK); and a second signaling is used for indicating a time domain location and/or a resource location of a physical resource block (PRB) for transmitting the HARQ-ACK.

In an exemplary embodiment, after the LBT procedure is performed on the unlicensed carrier, the method further includes: transmitting the HARQ-ACK by using a nearest transmission unit on a licensed carrier included in a predetermined cell group or abandoning transmission of the HARQ-ACK when the LBT procedure is unsuccessfully preformed on a predefined location or a feedback location indicated by the signaling on the unlicensed carrier; or feeding back failure information of the LTB procedure on a predefined licensed carrier when the LBT procedure is unsuccessfully performed on the predefined location or the feedback location indicated by the signaling on the unlicensed carrier, and all the HARQ-ACK is an ACK or a number of the ACK in the HARQ-ACK exceeds a threshold. In the embodiment, when the HARQ-ACK cannot be transmitted on the unlicensed carrier, the HARQ-ACK may be transmitted on the licensed carrier.

In an exemplary embodiment, the step of transmitting the HARQ-ACK by using the nearest transmission unit on the licensed carrier included in the predetermined cell group includes: transmitting the HARQ-ACK by using a nearest transmission unit periodically reserved on the licensed carrier included in the predetermined cell group. That is, when the HARQ-ACK is transmitted on the licensed carrier, a resource periodically reserved on the licensed carrier may be used for transmitting the HARQ-ACK.

Figure 2:
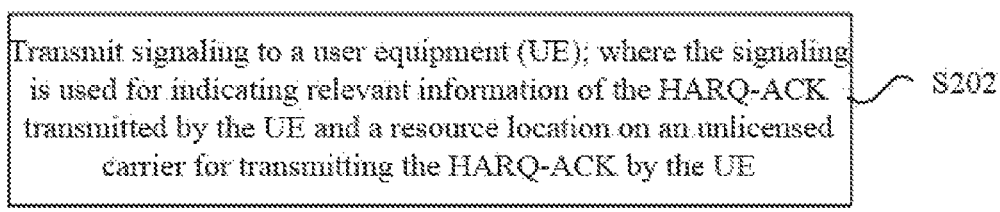
FIG. 2 is a second flowchart of an HARQ-ACK information transmission method according to an embodiment of the present disclosure.

An embodiment of the present disclosure further provides an HARQ-ACK transmission method. FIG. 2 is a second flowchart of an HARQ-ACK transmission method according to an embodiment of the present disclosure. As shown in FIG. 2, the method includes the step described below.

In step S202, signaling is transmitted to the UE. The signaling is used for indicating relevant information of the HARQ-ACK transmitted by the UE and a resource location on an unlicensed carrier for transmitting the HARQ-ACK by the UE.

The operation described above may be performed by a base station. The base station may indicate the HARQ-ACK to be transmitted by the UE and determine the resource location for transmitting the HARQ-ACK by the UE according to the signaling indication, so that the UE may transmit the HARQ-ACK on the determined resource location, thereby addressing impacts of a new frame structure and the LBT procedure on the transmission of an original timing relationship, improving a transmission probability and feedback flexibility of the HARQ-ACK and effectively improving system performance.

In an exemplary embodiment, the signaling indication includes at least one of: a carrier indication for feeding back the HARQ-ACK; a frequency domain resource location for transmitting the HARQ-ACK; a sub-frame position or a sub-frame set for feeding back an acknowledgement or a non-acknowledgement (ACK/NACK); a process number or a process group number of the HARQ of a physical downlink shared channel (PDSCH) that requires feedback of the ACK/NACK; a signaling indication for indicating a capability of delaying sending the HARQ-ACK; delay time for sending the HARQ-ACK; a size of a predefined transmission window of the ACK/NACK; a size of a sliding window of the PDSCH in a plurality of transmission units corresponding to the feedback of the HARQ-ACK, where the sliding window includes a predetermined number of consecutive downlink transmission units with variable positions; sliding granularity of the sliding window of the PDSCH in the plurality of transmission units corresponding to the feedback of the HARQ-ACK; an adjustment size of the sliding window of the PDSCH in the plurality of transmission units corresponding to the feedback of the HARQ-ACK; or a size of the HARQ-ACK.

In an exemplary embodiment, the HARQ-ACK includes an acknowledgement or a non-acknowledgement (ACK/NACK) corresponding to at least one transmission unit. The ACK/NACK corresponding to the at least one transmission unit includes at least one of: an ACK/NACK of a PDSCH corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time.

In an exemplary embodiment, the transmission unit includes one of: at least one sub-frame, at least one time slot, or at least one orthogonal frequency division multiplexing (OFDM) symbol.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the step in which the signaling indication is transmitted to the UE includes: carrying the signaling indication in a radio resource control (RRC) message and/or downlink control information (DCI) signaling indication; and transmitting the RRC message and/or DCI signaling indication carrying the signaling indication to the UE.

In an exemplary embodiment, the step of carrying the signaling indication in the DCI signaling indication includes: carrying the signaling indication in the DCI signaling indication. The DCI signaling indication includes at least one of a downlink (DL) grant, a public information indication, an uplink (UL) grant, or a group-user equipment (Group-UE) DCI indication.

In an exemplary embodiment, before the signaling indication is transmitted to the UE, the method further includes: semi-statically configuring, for the UE, a frequency domain resource set for transmitting the HARQ-ACK. The DCI signaling indication is used for indicating, from the frequency domain resource set, a frequency domain resource used by the UE for transmitting the HARQ-ACK. In the embodiment, the base station may semi-statically configure the frequency domain resource set for the UE and indicate a determined frequency domain resource via the DCI signaling indication. In an exemplary embodiment, the base station may also indicate the determined frequency domain resource via another type of signaling (for example, the RRC signaling) after semi-statically configuring the frequency domain resource set.

In an exemplary embodiment, the step in which the signaling indication is transmitted to the UE includes: transmitting two signalings to the UE: a first signaling is used for indicating at least one of: scheduling information used by the UE for transmitting the HARQ-ACK, a size of a frequency domain resource, a window size of a PDACH that requires feedback, or a size of an acknowledgment or a non-acknowledgment (ACK/NACK); and a second signaling is used for indicating a time domain location and/or a resource location of a physical resource block (PRB) used by the UE for transmitting the HARQ-ACK.

A method for transmitting an HARQ-ACK on an unlicensed spectrum provided in the present disclosure will be described in detail below with reference to the accompanying drawings and specific embodiments.

Embodiment 1

Figure 3:
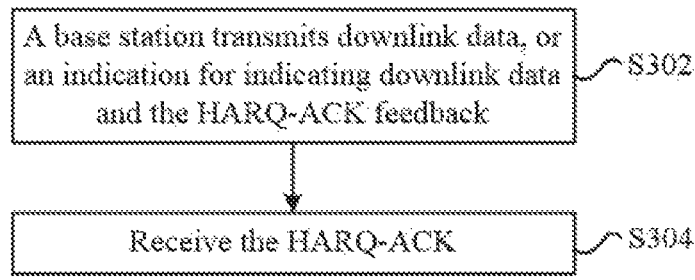
FIG. 3 is a flowchart showing a processing process on a base station side according to an embodiment of the present disclosure.

A processing flow on a base station side is described in this embodiment. As shown in FIG. 3, the flow includes the steps described below.

In step S302, the base station performs an LBT procedure on an unlicensed carrier and transmits relevant indication information for indicating downlink PDSCH data and HARQ-ACK feedback (corresponding to the signaling described above) after the LBT procedure is successfully performed.

The relevant indication information includes at least one of the following: a carrier indication for the HARQ-ACK feedback; a frequency domain resource location for transmitting the HARQ-ACK; a sub-frame position or a sub-frame set for feeding back an ACK/NACK; a HARQ process number or a HARQ process group number on the PDSCH that requires the ACK/NACK feedback; an indication of whether a transmission delay is allowed; delay time or a size of a predefined transmission window of the ACK/NACK when the transmission delay is allowed; a size of a sliding window for a PDSCH; or a size of an HARQ-ACK codebook (i.e., a plurality of HARQ-ACKs, which may be simply referred to as a codebook).

It may be indicated that the HARQ-ACK is transmitted on at least two carriers, which may all be unlicensed carriers or include at least one licensed carrier.

In an exemplary embodiment, the relevant indication information may be carried in one of the following.

(1) DL Grant

The base station indicates the sub-frame position for feeding back the ACK/NACK in DCI corresponding to the DL grant when the base station transmits the PDSCH.

(2) Common Information Indication

The relevant indication information may be carried in the common DCI, such as a DCI format 1C. And the timing value in the DCI for all UEs is the same. That means the ACK/NACK is fed back in the same sub-frame.

The DCI indication information is transmitted in the last sub-frame or the last two sub-frames of a downlink burst.

(3) UL Grant or UE-Specific DCI

The base station notifies, via a sub-frame indication field for the HARQ-ACK feedback in the DCI, the UE feedback the sub-frame position of the ACK/NACK corresponding to the PDSCH. The sub-frame position fed back by the UE may be related to an offset of a sub-frame position of the UL grant.

(4) Group-UE DCI Indication

A group of UEs is triggered to transmit the ACK/NACK in the same sub-frame.

(5) A network side semi-statically configures a plurality of sub-frame position groups or different sub-frame sets for the HARQ-ACK feedback and indicates dynamically a specific sub-frame set or position for the HARQ-ACK feedback by the DCI signaling.

In step S304, the base station receives the ACK/NACK on a predefined sub-frame position or a position of the HARQ-ACK feedback.

Embodiment 2

A processing flow on a terminal side (i.e., a user equipment side) is described in the embodiment.

Figure 4:
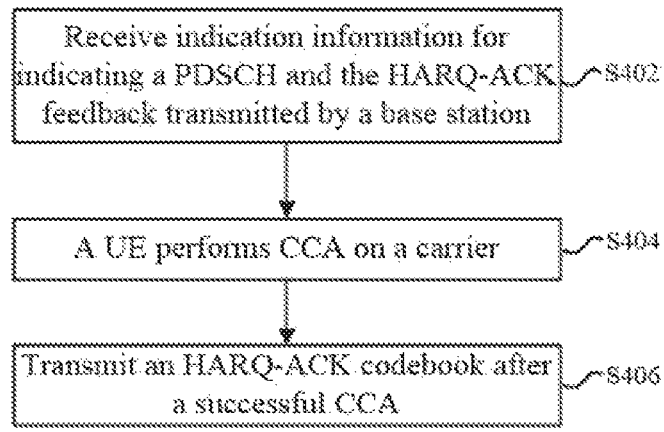
FIG. 4 is a flowchart showing a processing process on a terminal side according to an embodiment of the present disclosure.

As shown in FIG. 4, an HARQ-ACK transmission method applicable to a terminal includes the steps described below.

In step S402, a terminal receives and decodes the relevant indication information (the signaling described above) for indicating a PDSCH and the HARQ-ACK feedback transmitted by a base station.

The terminal may obtain the relevant indication information in a blind detection manner. The relevant indication information for the HARQ-ACK feedback may include at least one of the following: a carrier indication for feeding back the HARQ-ACK; a frequency domain resource location for transmitting the HARQ-ACK; a sub-frame position or a sub-frame set for feeding back an ACK/NACK; a HARQ process number or a HARQ process group number of the PDSCH that requires the ACK/NACK feedback; an indication whether a transmission delay is allowed; delay time or a size of a predefined transmission window of the ACK/NACK when the transmission delay is allowed; a size of a sliding window for a PDSCH; or a size of an HARQ-ACK codebook.

In step S404, the terminal performs an LBT procedure on a carrier indicated by the base station (which corresponds to the CCA in FIG. 4).

The terminal performs the LBT procedure under at least one of the following conditions: a sub-frame for HARQ-ACK codebook feedback received by the terminal carries indication information for scheduling a physical uplink shared channel (PUSCH); a sub-frame for the HARQ-ACK codebook feedback received by the terminal carries trigger information for reporting channel state information (CSI); or the terminal receives signaling indication information for transmitting the HARQ-ACK.

In step S406, the terminal transmits the HARQ-ACK codebook according to a predefinition and/or a signaling indication after the LBT procedure is successfully performed.

In an exemplary embodiment, the HARQ-ACK includes an ACK/NACK corresponding to a transmission unit of each of at least one PDSCH. The PDSCH corresponding to the HARQ-ACK codebook may be determined by a predefined PDSCH window or the PDSCH process number indicated by signaling.

The size of the HARQ-ACK codebook corresponds to the number of PDSCHs that requires the ACK/NACK feedback, or is identical to a size of the sliding window.

The HARQ-ACK codebook to be fed back includes an ACK/NACK corresponding to a transmission units of each of the plurality of PDSCH on all carriers in a predetermined cell group. The HARQ-ACK codebook on each carrier includes at least one of the following: an ACK/NACK of the PDSCH corresponding to a plurality of transmission units within a predefined sliding window or a sliding window indicated by the signaling; an ACK/NACK corresponding to a PDSCH process number or a PDSCH process group number indicated by the signaling; an ACK/NACK corresponding to a transmission unit dynamically indicated by higher layer signaling and/or DCI; or an ACK/NACK corresponding to all transmission units of the PDSCH that satisfies a predefined timing relationship in a time period from a last feedback time of the PDSCH sub-frame to a current feedback time of the sub-frame.

If the LBT procedure is unsuccessfully performed on the sub-frame, the LBT procedure will be continued on the next sub-frame or the next indicated feedback location or data scheduling location. If the LBT procedure is unsuccessfully performed within predefined time, the HARQ-ACK will be transmitted on a reserved resource of a licensed carrier. The reserved resource may be a resource periodically reserved from a time for transmitting the PDSCH on the unlicensed carrier occupied by the base station. Alternatively, the transmission of the HARQ-ACK is abandoned.

Embodiment 3

A method for the HARQ-ACK feedback on a PDSCH received by a terminal is described in the embodiment.

If the terminal performs an LBT procedure successfully on a sub-frame #N, a corresponding ACK/NACK may be fed back on the sub-frame #N when a PDSCH sub-frame is greater than or equal to 4 sub-frames from a last feedback location (i.e., a sub-frame transmitted by the PDSCH having a distance of at least 4 sub-frames from the sub-frame #N).

The terminal performs the LBT procedure on the sub-frame #N under at least one of the following trigger conditions: a sub-frame received by the terminal has indication information for scheduling a PUSCH; a sub-frame received by the terminal has trigger information for reporting CSI; the terminal receives signaling indication information for transmitting the HARQ-ACK; or the terminal receives information that it needs to transmit uplink data on the sub-frame #N, where the uplink data includes traffic data and control information data, where the control information data includes the HARQ-ACK feedback and a CSI report.

Figure 5:
FIG. 5 is a first schematic diagram of feeding back the HARQ-ACK information corresponding to the PDSCH according to an embodiment of the present disclosure.
Figure 5:
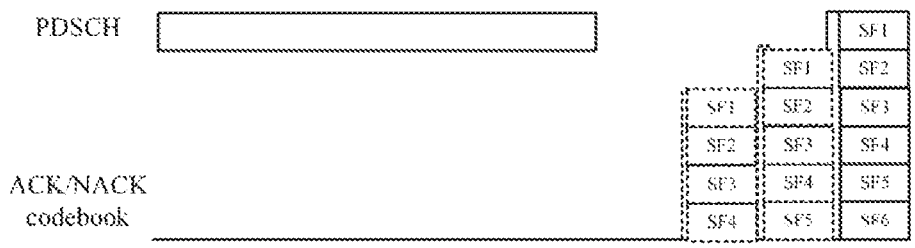

As shown in FIG. 5, it is assumed the terminal receives indication information transmitted by the base station and the indication information indicates that the UE needs to perform the LBT procedure on the sub-frame #8. If the UE performs the LBT procedure successfully on the sub-frame 8, the UE may transmit an ACK/NACK corresponding to the PDSCHs of sub-frames #1, #2, #3 and #4 on the sub-frame #8. If the UE performs the LBT procedure successfully on the sub-frame #8 and still has uplink data to transmit on the sub-frame #9, the UE merely transmits the ACK/NACK corresponding to the PDSCH of the sub-frame #5 on the sub-frame #9. If the UE performs the LBT procedure unsuccessfully on the sub-frame #8 and performs the LBT procedure successfully on the sub-frame #9, the UE feeds back the ACK/NACK corresponding to the PDSCHs of sub-frames #1-#5 on the sub-frame #9. Similarly, if the UE performs the LBT procedure unsuccessfully on the sub-frame #9, the UE needs to perform the LBT procedure on a sub-frame #10 and transmit the ACK/NACK corresponding to the PDSCHs of sub-frames #1-#6 together on the sub-frame #10 when the LBT procedure is successfully performed on the sub-frame #10.

When the terminal can transmit a PUCCH on the carrier, the HARQ-ACK will be transmitted on the PUCCH.

When the terminal cannot transmit the PUCCH on the carrier, the HARQ-ACK will be transmitted on the PUSCH.

Embodiment 4

Another method for transmitting an HARQ-ACK will be described in this embodiment.

A sliding window of a PDSCH is defined in this embodiment. The sliding window may be semi-statically configured by higher layer signaling or indicated by DCI.

A terminal only feeds back an ACK/NACK corresponding to a transmission unit of each PDSCH, within the sliding window of the PDSCH, which is greater than or equal to 4 sub-frames from a sub-frame position for the ACK/NACK feedback (a sub-frame transmitted by the PDSCH having a distance of at least 4 sub-frames from the sub-frame position of the sub-frame #N) on the sub-frame position indicated by signaling.

Alternatively, the terminal feeds back the sub-frame position of the ACK/NACK on a position obtained by adding 4 sub-frames to the last sub-frame in the sliding window. If the terminal performs an LBT procedure successfully, the terminal transmits ACK/NACK corresponding to each of all transmission units of the PDSCH of all sub-frames together in the sliding window.

For example, it is assumed that a predefined sliding window has a size of 4 ms and the sliding window begins from the first sub-frame of a DL burst. According to a predefined timing relationship that 4 ms is added to the last sub-frame in the sliding window, the UE performs the LBT procedure on the sub-frame #8. If the LBT procedure is successfully performed on the sub-frame #8, the UE feeds back the ACK/NACK corresponding to transmission units of the PDSCHs of sub-frames #1-#4 on the sub-frame #8. If the LBT procedure is unsuccessfully performed on the sub-frame #8, the UE continues performing the LBT procedure on the sub-frame #9. If the LBT procedure is successfully performed on the sub-frame #9, the UE transmits the ACK/NACK corresponding to transmission units of the PDSCHs of sub-frames #2-#5 on the sub-frame #9. Similarly, if the LBT procedure is unsuccessfully performed on the sub-frame #9, the UE performs the LBT procedure on the sub-frame #10. If the LBT procedure is successfully performed on the sub-frame #10, the UE transmits the ACK/NACK corresponding to transmission units of the PDSCHs of sub-frames #3-#6 on the sub-frame #10.

Figure 6:
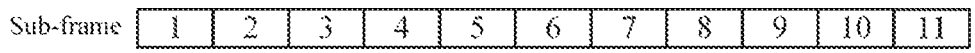
FIG. 6 is a second schematic diagram of feeding back the HARQ-ACK information corresponding to the PDSCH according to an embodiment of the present disclosure.
Figure 6:
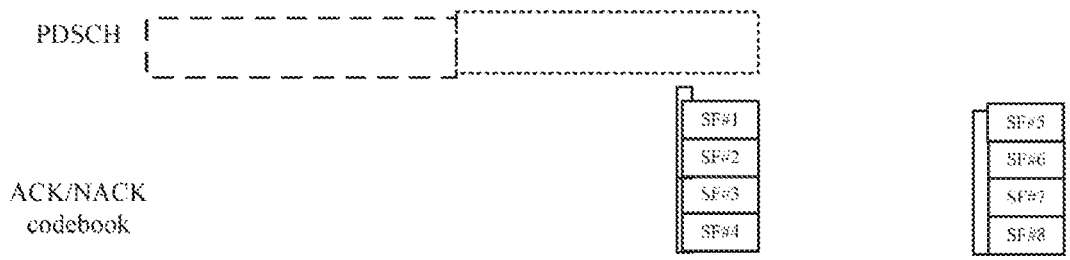

On the contrary, if the terminal performs the LBT procedure successfully on the sub-frame #8, the sliding window slides 4 sub-frames backward. That is, the sliding window includes sub-frames #5-#8, the terminal transmits the ACK/NACK corresponding to the sliding window on sub-frame #12, as shown in FIG. 6.

Embodiment 5

A size and content of the HARQ-ACK codebook transmitted by a terminal will be described in this embodiment.

Two cases are described below.

Case 1: the size of the HARQ-ACK codebook fed back by a UE is identical to the number of sub-frames on PDSCHs corresponding to the UE in a sliding window. Each PDSCH sub-frame corresponds to a 1-bit ACK/NACK. If the sliding window includes PDSCHs corresponding to the UE, the ACK/NACK corresponding to all these PDSCHs may be fed back. The ACK/NACK codebook of each feedback has an unfixed size.

Figure 7:
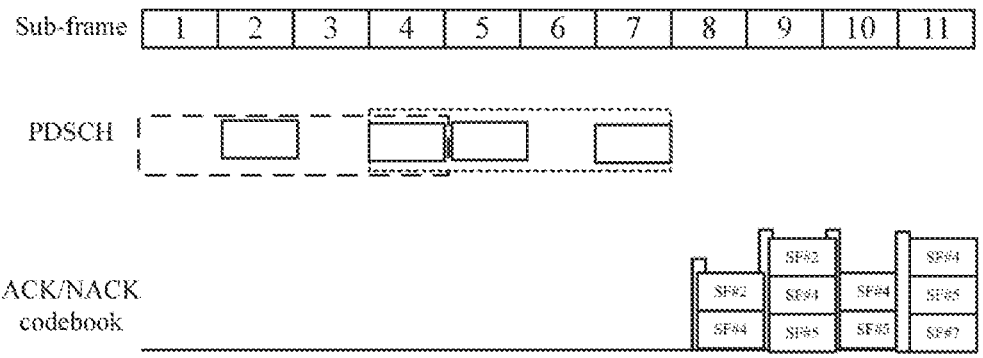
FIG. 7 is a third schematic diagram of feeding back the HARQ-ACK information corresponding to the PDSCH according to an embodiment of the present disclosure.

For example, as shown in FIG. 7, merely sub-frames #2, #4, #5 and #7 have PDSCHs corresponding to the UE among sub-frames #1-#7. The ACK/NACK corresponding to sub-frames #2 and #4 may be fed back on the sub-frame #8. The ACK/NACK corresponding to sub-frames #2, #4 and #5 may be fed back on the sub-frame #9. The ACK/NACK corresponding to sub-frames #4 and #5 may be fed back on the sub-frame #10. The ACK/NACK corresponding to sub-frames #4, #5 and #7 may be fed back on the sub-frame #11.

In the case, the UE determines the codebook size to be fed back by a value of a DAI in a UL/DL grant.

Alternatively, the DAI may be expanded on a plurality of carriers. The DAI is represented by a two-dimensional array. One dimension represents a carrier and the other dimension represents the number of PDSCHs transmitted on the carrier. With the information of the two-dimensional array, the UE determines the number of bits to be fed back on each carrier, further reducing an impact of undetected DCI.

Case 2: the size of the HARQ codebook is fixed to be identical to the number of sub-frames in the sliding window, and a NACK is fed back for any sub-frame which does not receive a PDSCH.

A base station receives the feedback based on a sub-frame index and an HARQ process number, and ignores the bits that do not transmit a PDSCH.

Figure 8:
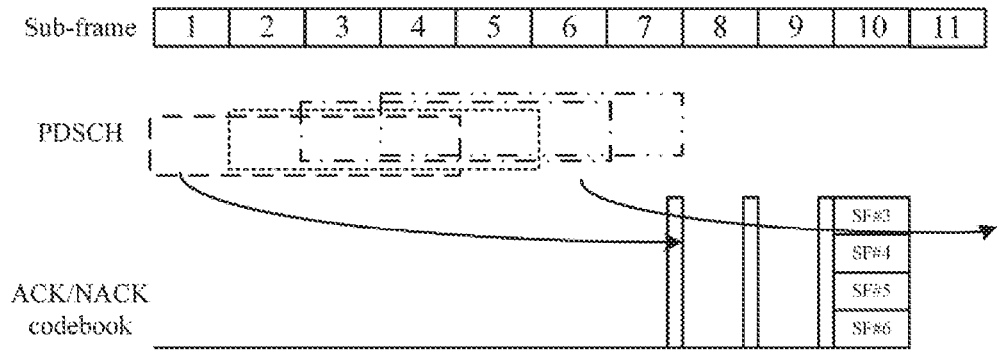
FIG. 8 is a fourth schematic diagram of feeding back the HARQ-ACK information corresponding to the PDSCH according to an embodiment of the present disclosure.

For example, as shown in FIG. 8, the size of the sliding window is 4 ms and the size of the ACK/NACK codebook is fixed to be 4 bits. Each PDSCH sub-frame has at most 4 feedback opportunities.

The sliding window of the PDSCH slides each time according to a granularity of one transmission unit or a granularity of one time window length or a granularity of k (k is a positive integer greater than or equal to 2) transmission units.

In an exemplary embodiment, the size of the sliding window or a size of a PDSCH feedback window may be dynamically adjusted. For example, if the UE performs the LBT procedure unsuccessfully on the sub-frame #8, the UE may expand the size of the sliding window from 4 sub-frames to 5 sub-frames. That is, if the UE performs the LBT procedure successfully on the sub-frame #9, the UE may feedback the ACK/NACK corresponding to transmission units of the PDSCHs of sub-frames #1-#5 on the sub-frame #9.

Embodiment 6

A method for the HARQ-ACK feedback according to the signaling indication will be described in the embodiment.

The signaling indication may include at least one of the following.

(1) Indication by a DL Grant

The sub-frame position for feeding back the ACK/NACK is indicated in DCI corresponding to the DL grant when a PDSCH is transmitted.

For example, when the ACK/NACK is transmitted on a PUSCH, an offset of an original N+4 position from a position for transmitting the HARQ-ACK is given in a 2-bit field or other bit fields corresponding to a TPC command for PUCCH in the DCI, where N denotes a sub-frame of the DCI corresponding to the PDSCH.

Alternatively, a sub-frame position for feeding back the HARQ-ACK may be implicitly determined according to a CCE index corresponding to the PDSCH.

(2) Public Information Indication

The relevant indication information may be carried in the common DCI, such as a DIC format 1C. And the timing value in the DCI for all UEs is the same. That means the ACK/NACK is fed back in the same sub-frame.

The DCI indication information is transmitted in the last sub-frame or the last two sub-frames of a downlink burst.

A UE obtains a C-Physical Downlink Control Channel (PDCCH) by a blind detection of a cell-specific reference signal (CRS) and determines the sub-frame position for the feedback and/or a PDSCH process for the feedback according to indication information in the C-PDCCH. That is, UE obtains the C-PDCCH in a cell-specific manner.

(3) Indication by a UL Grant or UE-Specific DCI

A base station notifies, via a sub-frame indication field for the HARQ-ACK feedback in the DCI, the UE feedback the sub-frame position of the ACK/NACK corresponding to the PDSCH. The sub-frame position fed back by the UE may be related to an offset of a sub-frame position of the UL grant. For example, 00 represents a first sub-frame following a sub-frame of the signaling indication, 01 represents a second sub-frame following the sub-frame of the signaling indication, 10 represents a third sub-frame following the sub-frame of the signaling indication, and 11 represents a fourth sub-frame following the sub-frame of the signaling indication and the fourth sub-frame is used for transmitting an HARQ-ACK codebook.

(4) Group-UE DCI Indication

A group of UEs is triggered to transmit the ACK/NACK in the same sub-frame.

(5) A network side semi-statically configures a plurality of sub-frame position groups or different sub-frame sets for the HARQ-ACK feedback and indicates dynamically a specific sub-frame set or position for the HARQ-ACK feedback by DCI signaling.

For example, the network side configures, via a RRC message, the feedback sub-frame positions included in the sub-frame set #1 as {3, 4, 5, 7}, the feedback sub-frame positions included in the sub-frame set #2 as {6, 7, 8, 9}, the feedback sub-frame positions included in the sub-frame set #3 as {2, 4, 5, 6}, and the feedback sub-frame positions included in the sub-frame set #4 as {1, 2, 3}. The base station indicates a final set of sub-frame positions by 2 bits in the DCI dynamic signaling. Alternatively, each set has merely one candidate sub-frame position and the base station dynamically indicates the HARQ-ACK feedback on one sub-frame finally.

Embodiment 7

The content included in the indication signaling described above will be described in the embodiment.

The content of the indication signaling on transmission of an HARQ-ACK transmitted by a base station to a terminal includes at least one of the following: a carrier indication for the HARQ-ACK feedback, where at least one carrier is indicated; a frequency domain resource location; a HARQ process number or a HARQ process group number of the PDSCH that requires the ACK/NACK feedback, where the HARQ process group number refers to that a plurality of PDSCH process group number sets are semi-statically configured by higher layer signaling and one PDSCH process group number set corresponding to the HARQ-ACK feedback is notified by dynamic signaling; an indication of whether a transmission delay is allowed; delay time or a size of the predefined transmission window when the transmission delay is allowed; a size of a sliding window of a PDSCH; a sliding granularity of the sliding window; an adjustment size of the sliding window; or a sub-frame position or a sub-frame set for feeding back the ACK/NACK.

The terminal preforms data preparations and transmission of the HARQ-ACK according to indication information.

Embodiment 8

A method for transmitting an HARQ-ACK in a predefinition manner will be described in this embodiment.

A terminal transmits an HARQ-ACK codebook on a corresponding sub-frame in the predefinition manner by one of the following modes.

Figure 9:
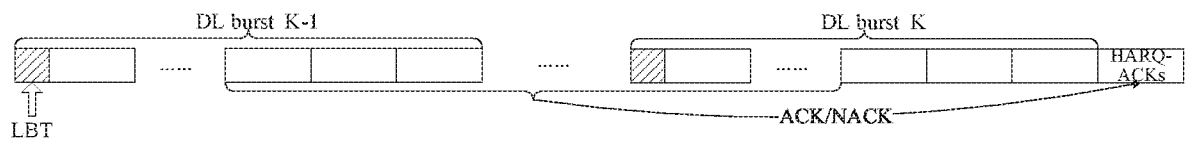
FIG. 9 is a first schematic diagram of a timing relationship between an ACK/NACK and a PDSCH according to an embodiment of the present disclosure.

Mode 1: the UE transmits the HARQ-ACK codebook on a first uplink sub-frame after an Kth DL burst. The feedback HARQ-ACK codebook includes an ACK/NACK corresponding to all PDSCHs of the UE which are greater than or equal to 4 sub-frames from the first uplink sub-frame in the Kth DL burst and an ACK/NACK corresponding to PDSCHs of the UE on the last three sub-frames in an (K−1)th DL burst, as shown in FIG. 9.

The first uplink sub-frame includes a part or all of an uplink sub-frame.

Figure 10:
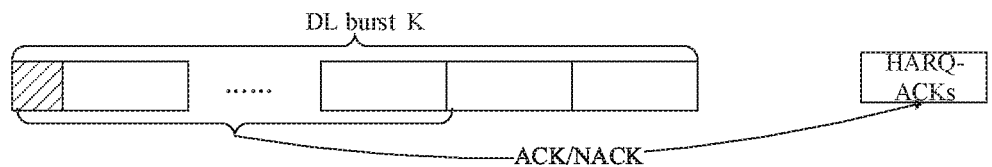
FIG. 10 is a second schematic diagram of a timing relationship between an ACK/NACK and a PDSCH according to an embodiment of the present disclosure.

Mode 2: The HARQ-ACK is transmitted on a sub-frame position obtained by adding 4 ms to the last sub-frame position of the PDSCHs corresponding to the UE in the Kth DL burst. As shown in FIG. 10, the transmitted HARQ-ACK codebook includes the ACK/NACK corresponding to all PDSCHs of the UE in the Kth DL burst.

In the mode 2, if the sub-frame for transmitting the HARQ-ACK has a corresponding UL grant, a frequency domain resource of the HARQ-ACK is determined according to a location indicated by DCI in the UL grant. If the sub-frame for transmitting the HARQ-ACK does have the corresponding UL grant, the frequency domain resource of the HARQ-ACK is determined according to a location configured semi-statically by higher layer signaling.

Embodiment 9

A method for transmitting an HARQ-ACK codebook via two indications will be described in this embodiment.

A base station firstly transmits an initial sub-frame position for transmitting an HARQ-ACK via DCI signaling. For example, the base station indicates the terminal to transmit the HARQ-ACK on a sub-frame position #(n+r), where n is a sub-frame containing the DCI and r is a positive integer.

Alternatively, the terminal prepares the HARQ-ACK codebook in the predefinition manner of the embodiment 6 and determines the initial sub-frame position for the HARQ-ACK feedback.

However, when the sub-frame #(n+r) is a downlink sub-frame or new downlink data arrives, the base station may transmit new DCI indication information on a sub-frame #(n+m) and delay the sub-frame position for feeding back the HARQ-ACK. For example, the sub-frame position is delayed to a sub-frame #(n+r+2), or the sub-frame position is dynamically adjusted, where m is a positive integer.

The terminal transmits the HARQ-ACK on a corresponding sub-frame according to an indication in indication signaling after receiving the indication signaling.

The transmission reliability or flexibility of the HARQ-ACK via two indications may be improved.

Embodiment 10

Figure 11:
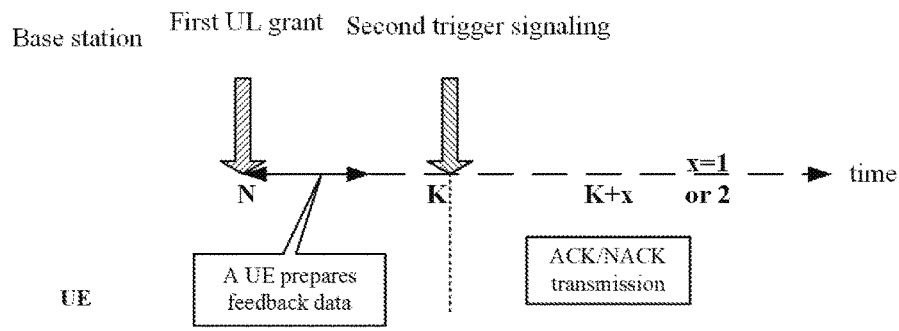
FIG. 11 is a schematic diagram of a process for triggering and transmitting HARQ-ACK information according to an embodiment of the present disclosure.

A method for transmitting an HARQ-ACK in a manner indicated by multi-level signaling will be described in this embodiment. A specific procedure is shown in FIG. 11.

A base station transmits a first trigger signaling for the HARQ-ACK on a sub-frame N. The first trigger signaling includes ACK/NACK scheduling information, where the ACK/NACK scheduling information includes a size of a resource for HARQ-ACK transmission, a window size of a PDSCH that requires HARQ-ACK feedback, or a size of an ACK/NACK codebook.

A UE prepares HARQ-ACK codebook data to be fed back according to indication information after receiving the first trigger signaling.

The base station indicates, via a second trigger signaling, a sub-frame position #(K+x) for transmitting the HARQ-ACK and/or a mapped PRB resource position on a sub-frame #K, where x is equal to 1 or 2 or 3.

The UE transmits the prepared HARQ-ACK codebook on an indicated sub-frame position.

Embodiment 11

Synchronization of an uplink HARQ-ACK feedback will be described in this embodiment.

When a sub-frame position on which a UE transmits an HARQ-ACK is not a predefined sub-frame position or a sub-frame position indicated by a base station, the UE needs to transmit additional bits to enable the base station and the UE to maintain ACK/NACK reporting synchronization.

When the UE delays ACK/NACK transmission by one or more sub-frames according to an LBT result or the size of an HARQ-ACK codebook is uncertain, the UE enables an evolved Node B (eNB) to have a consistent understanding of the HARQ codebook with the UE by one of the following modes.

Mode 1: a process number of a corresponding PDSCH is included in the ACK/NACK. For example, if a maximum process number of the PDSCH is 15, each PDSCH sub-frame corresponds to 4-bit feedback information, the first 3 bits represent a process number of the PDSCH, and the rest 1 bit represents a value of the ACK/NACK corresponding to the PDSCH sub-frame.

The base station decodes the HARQ-ACK codebook every 4 bits to obtain ACK/NACK information corresponding to each PDSCH sub-frame when receiving the HARQ-ACK codebook.

Mode 2: a sub-frame position for transmitting the HARQ-ACK is indicated by carrying a sub-frame offset from a predefined sub-frame position. If a feedback window is 4 ms, the offset of a final sub-frame position from the predefined sub-frame position is indicated by 2 bits. For example, 00 represents the predefined sub-frame position, 01 represents a sub-frame obtained by shifting one sub-frame backward from the predefined sub-frame position, 10 represents a sub-frame obtained by shifting two sub-frames backward from the predefined sub-frame position, and 11 represents a sub-frame obtained by shifting three sub-frames backward from the predefined sub-frame position. The 1 bit after the 2 bits indicates the value of the ACK/NACK.

Embodiment 12

Another case where an HARQ-ACK is transmitted will be described in this embodiment.

When a certain PUCCH cell group or a UCI cell group configured by a terminal includes a licensed carrier, the terminal may further transmit the HARQ-ACK or UCI on all carriers of the cell group to a predefined licensed carrier.

A specific procedure is described below.

Some resources are periodically reserved on the predefined licensed carrier or a certain semi-statically configured licensed carrier.

If the terminal fails to transmit the HARQ-ACK or perform the LBT procedure on a specified location of the unlicensed carrier, the terminal transmits the HARQ-ACK or UCI information of the cell group on the reserved resource locations of the licensed carrier.

The methods for transmitting UCI on an unlicensed spectrum provided by the present disclosure can solve a specific problem of transmitting the HARQ-ACK in uplink transmission on the unlicensed carrier in the LTE. The methods are suitable for the characteristics of the unlicensed carrier and a Frame structure type 3.

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on the understanding, the solutions provided by the present disclosure substantially, or the part contributing to the existing art, may be embodied in the form of a software product. The computer software product is stored in a storage medium (such as an ROM/

RAM, a magnetic disk or an optical disk) and includes several instructions for enabling a terminal device (which may be a mobile phone, a computer, a server, a network device, or the like) to execute the method according to each embodiment of the present disclosure.

An embodiment of the present disclosure further provides an HARQ-ACK transmission apparatus. The apparatus is used for implementing the above-mentioned embodiments and preferred embodiments. What has been described above will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 12:
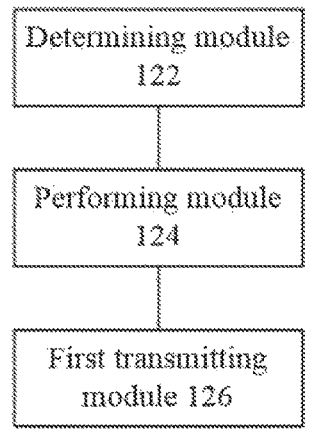
FIG. 12 is a first block diagram of an HARQ-ACK information transmission apparatus according to an embodiment of the present disclosure.

FIG. 12 is a first block diagram of an HARQ-ACK transmission apparatus according to an embodiment of the present disclosure. As shown in FIG. 12, the apparatus includes a determining module 122, a performing module 124, and a first transmitting module 126. The apparatus is described below.

The determining module 122 is configured to determine an HARQ-ACK to be transmitted and a resource location on an unlicensed carrier for transmitting the HARQ-ACK according to a predefinition or a signaling indication. The performing module 124 is connected to the determining module 122 and configured to perform a listen before talk (LBT) procedure on the unlicensed carrier. The first transmitting module 126 is connected to the performing module 124 and configured to transmit the HARQ-ACK on the resource location after the LBT procedure is successfully performed.

In an exemplary embodiment, the signaling indication includes at least one of: a carrier indication for feeding back the HARQ-ACK; a frequency domain resource location for transmitting the HARQ-ACK; a sub-frame position or a sub-frame set for feeding back the ACK/NACK; a process number or a process group number of the HARQ of the PDSCH that requires feedback of the ACK/NACK; a signaling indication for indicating a capability of delaying sending the HARQ-ACK; delay time for sending the HARQ-ACK; a size of a predefined transmission window of the ACK/NACK; a size of a sliding window of the PDSCH in a plurality of transmission units corresponding to the feedback of the HARQ-ACK, where the sliding window includes a predetermined number of consecutive downlink transmission units with variable positions; a sliding granularity of the sliding window of the PDSCH in the plurality of transmission units corresponding to the feedback of the HARQ-ACK; an adjustment size of the sliding window of the PDSCH in the plurality of transmission units corresponding to the feedback of the HARQ-ACK; or a size of the HARQ-ACK.

In an exemplary embodiment, the HARQ-ACK includes the ACK/NACK corresponding to at least one transmission unit. The ACK/NACK corresponding to the at least one transmission unit includes at least one of: an ACK/NACK of a PDSCH corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time.

In an exemplary embodiment, the transmission unit includes one of: at least one sub-frame, at least one time slot, or at least one orthogonal frequency division multiplexing (OFDM) symbol.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the determining module 122 may determine the HARQ-ACK to be transmitted and the resource location for transmitting the HARQ-ACK according to the signaling indication by: obtaining signaling indication carried in a received radio resource control (RRC) message and/or received downlink control information (DCI) signaling indication; and determining the HARQ-ACK to be transmitted and the resource location for transmitting the HARQ-ACK according to the obtained signaling indication.

In an exemplary embodiment, the determining module 122 may obtain the signaling indication carried in the received DCI signaling indication by: obtaining the signaling indication carried in the received DCI signaling indication. The DCI signaling indication includes at least one of a downlink (DL) grant, a public information indication, an uplink (UL) grant, or a group-user equipment (Group-UE) DCI indication.

In an exemplary embodiment, when the HARQ-ACK includes the ACK/NACK corresponding to all transmission units of the PDSCH in a time window, a sliding window of a PDSCH corresponding to feedback of the HARQ-ACK slides according to a sliding granularity indicated by the signaling or a granularity of one time window length or a granularity of one sliding window length or a granularity of K transmission units, where K is a positive integer.

In an exemplary embodiment, a time domain resource location for transmitting the HARQ-ACK includes one of: a location of a first uplink transmission unit after a downlink burst; a location indicated by the signaling; a location determined by adding Q transmission units to a location of a transmission unit of a last PDSCH, where Q is a predefined value or a value configured by the signaling; and a location determined by adding the Q transmission units to a location of a last transmission unit in a sliding window of the PDSCH, where Q is the predefined value or the value configured by the signaling.

In an exemplary embodiment, a frequency domain resource location for transmitting the HARQ-ACK may be determined by at least one of: determining, according to a physical resource block (PRB) location indicated by the signaling, a frequency domain resource location for transmitting the HARQ-ACK; determining, according to a relationship between an interleaving unit and a control channel element (CCE) index of a control channel corresponding to a physical downlink shared channel (PDSCH), the frequency domain resource location for transmitting the HARQ-ACK; or determining, according to a transmit power control (TPC) command or allocated resource index (ARI) signaling in downlink control information (DCI) of a secondary cell (Scell), the frequency domain resource for transmitting the HARQ-ACK after a frequency domain resource set of higher layer semi-static configuration is determined.

In an exemplary embodiment, physical resource blocks (PRBs) included in the interleaving unit are uniformly and discretely distributed within a system bandwidth; and/or the same interleaving unit is code-division or time-division multiplexed by different user equipments (UEs).

In an exemplary embodiment, when the HARQ-ACK includes an HARQ-ACK corresponding to a plurality of transmission units on one carrier, the HARQ-ACK may be determined by at least one of: a size of a sliding window of a physical downlink shared channel (PDSCH) in a plurality of transmission units corresponding to feedback of the HARQ-ACK; a number of PDSCHs corresponding to a user equipment (UE) received in the sliding window of the PDSCH in the plurality of transmission units corresponding to the feedback of the HARQ-ACK; a value of a last downlink assignment index (DAI) received in the sliding window of the PDSCH in the plurality of transmission units corresponding to the feedback of the HARQ-ACK; a value of a last DAI received; a number of PDSCHs corresponding to the UE and being included in a previous downlink burst; or a size of the HARQ-ACK indicated by the signaling.

In an exemplary embodiment, when the HARQ-ACK includes an HARQ-ACK of all carriers in an uplink control information (UCI) cell group, the first transmitting module 126 may transmit the HARQ-ACK on the resource location by: concatenating the HARQ-ACK of all the carriers in a predetermined order; and transmitting the concatenated HARQ-ACK of all the carriers on the resource location.

In an exemplary embodiment, the first transmitting module 126 may transmit the HARQ-ACK on the resource location by: transmitting, on the resource location, the HARQ-ACK and at least one of: process number information of the PDSCH corresponding to the HARQ-ACK, or offset information of a predetermined time domain resource location or a time domain resource location indicated by the signaling from the resource location.

In an exemplary embodiment, the determining module 122 may determine the resource location for transmitting the HARQ-ACK according to the signaling indication by: determining the resource location for transmitting the HARQ-ACK via two signalings: the first signaling is used for indicating at least one of: scheduling information for transmitting the HARQ-ACK, a size of a frequency domain resource, a window size of a PDSCH that requires feedback, or a size of an acknowledgment or a non-acknowledgment (ACK/NACK); and the second signaling is used for indicating a time domain location and/or a resource location of a physical resource block (PRB) for transmitting the HARQ-ACK.

In an exemplary embodiment, the apparatus further includes a first processing module. The first processing module is configured to, after the LBT procedure is performed on the unlicensed carrier, transmit the HARQ-ACK by using a nearest transmission unit on a licensed carrier included in a predetermined cell group or abandon transmission of the HARQ-ACK when the LBT procedure is unsuccessfully performed on a predefined location or a feedback location indicated by the signaling on the unlicensed carrier; or feedback failure information of the LTB procedure on a predefined licensed carrier when the LBT procedure is unsuccessfully performed on the predefined location or the feedback location indicated by the signaling on the unlicensed carrier, and all the HARQ-ACK is an ACK or a number of the ACK in the HARQ-ACK exceeds a threshold.

In an exemplary embodiment, the first processing module may transmit the HARQ-ACK by using the nearest transmission unit on the licensed carrier included in the predetermined cell group by: transmitting the HARQ-ACK by using a nearest transmission unit periodically reserved on the licensed carrier included in the predetermined cell group.

Figure 13:
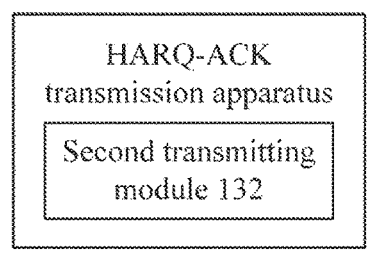
FIG. 13 is a second block diagram of an HARQ-ACK information transmission apparatus according to an embodiment of the present disclosure.

FIG. 13 is a second block diagram of an HARQ-ACK transmission apparatus according to an embodiment of the present disclosure. As shown in FIG. 13, the apparatus includes a second transmitting module 132. The apparatus is described below.

The second transmitting 132 is configured to transmit signaling indication to a user equipment (UE). The signaling indication is used for indicating relevant information of the HARQ-ACK transmitted by the UE and a resource location on an unlicensed carrier for transmitting the HARQ-ACK by the UE.

In an exemplary embodiment, the signaling indication includes at least one of: a carrier indication for feeding back the HARQ-ACK; a frequency domain resource location for transmitting the HARQ-ACK; a sub-frame position or a sub-frame set for feeding back an acknowledgement or a non-acknowledgement (ACK/NACK); a process number or a process group number of the HARQ of a physical downlink shared channel (PDSCH) that requires feedback of the ACK/NACK; a signaling indication for indicating a capability of delaying sending the HARQ-ACK; delay time for sending the HARQ-ACK; a size of a predefined transmission window of the ACK/NACK; a size of a sliding window of the PDSCH in a plurality of transmission units corresponding to the feedback of the HARQ-ACK, where the sliding window includes a predetermined number of consecutive downlink transmission units with variable positions; sliding granularity of the sliding window of the PDSCH in the plurality of transmission units corresponding to the feedback of the HARQ-ACK; an adjustment size of the sliding window of the PDSCH in the plurality of transmission units corresponding to the feedback of the HARQ-ACK; or a size of the HARQ-ACK.

In an exemplary embodiment, the HARQ-ACK includes an acknowledgement or a non-acknowledgement (ACK/NACK) corresponding to at least one transmission unit. The ACK/NACK corresponding to the at least one transmission unit includes at least one of: an ACK/NACK of a PDSCH corresponding to at least two transmission units within a predefined time window or a sliding window indicated by the signaling; an ACK/NACK corresponding to a process number or a process group number of the PDSCH indicated by the signaling; an ACK/NACK corresponding to a transmission unit dynamically indicated by higher layer signaling and/or downlink control information (DCI); or an ACK/NACK corresponding to all transmission units of the PDSCH that satisfies a predefined timing relationship in a time period from a last feedback time of an ACK/NACK corresponding to a transmission unit of a PDSCH to a current feedback time.

In an exemplary embodiment, the transmission unit includes one of: at least one sub-frame, at least one time slot, or at least one orthogonal frequency division multiplexing (OFDM) symbol.

In an exemplary embodiment, the predefined timing relationship is that a time difference between a transmission unit of a PDSCH and a location for transmitting the ACK/NACK is greater than or equal to N transmission units, where N is a positive integer.

In an exemplary embodiment, the second transmitting module 132 may transmit the signaling indication to the UE by: carrying the signaling indication in a radio resource control (RRC) message and/or downlink control information (DCI) signaling indication; and transmitting the RRC message and/or DCI signaling indication carrying the signaling indication to the UE.

In an exemplary embodiment, the second transmitting module 132 may carry the signaling indication in the DCI signaling indication by: carrying the signaling indication in the DCI signaling indication. The DCI signaling indication includes at least one of a downlink (DL) grant, a public information indication, an uplink (UL) grant, or a group-user equipment (Group-UE) DCI indication.

In an exemplary embodiment, the apparatus further includes a second processing module. The second processing module is configured to, before the signaling indication is transmitted to the UE, semi-statically configure, for the UE, a frequency domain resource set for transmitting the HARQ-ACK. The DCI signaling indication is used for indicating, from the frequency domain resource set, a frequency domain resource used by the UE for transmitting the HARQ-ACK.

In an exemplary embodiment, the second transmitting module 132 may transmit the signaling indication to the UE by: transmitting two signalings to the UE: the first signaling is used for indicating at least one of: scheduling information used by the UE for transmitting the HARQ-ACK, a size of a frequency domain resource, a window size of a PDACH that requires feedback, or a codebook size of an acknowledgment or a non-acknowledgment (ACK/NACK); and the second signaling is used for indicating a time domain location and/or a resource location of a physical resource block (PRB) used by the UE for transmitting the HARQ-ACK.

It should be noted that, some embodiments in the present disclosure are described using an example in which one sub-frame is used as one transmission unit, but the method is also applicable to cases where one transmission unit includes a plurality of sub-frames or at least one time slot or at least one orthogonal frequency division multiplexing (OFDM) symbols.

The various modules described above may be implemented by software or hardware. Implementation by hardware may, but may not necessarily, be performed by the following method: The various modules described above are located in a same processor or their respective processors.

An embodiment of the present disclosure further provides a storage medium. In an exemplary embodiment, the storage medium may be configured to store program codes for executing the steps described above.

In an exemplary embodiment, in the embodiment, the storage medium may include, but is not limited to, a U disk, a read-only memory (ROM), a random access memory (RAM), a mobile hard disk, a magnetic disk, an optical disk or another medium capable of storing program codes.

In an exemplary embodiment, in the embodiment, a processor executes the steps described above according to the program codes stored in the storage medium.

In an exemplary embodiment, for specific examples in the embodiment, reference may be made to the examples described in the above embodiments and optional embodiments, and repetition will not be made in the embodiment.

Apparently, those skilled in the art should know that each of the above-mentioned modules or steps of the present disclosure may be implemented by a general-purpose computing device, the modules or steps may be concentrated on a single computing device or distributed on a network formed by multiple computing devices, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

As described above, an HARQ-ACK transmission method and apparatus provided by embodiments of the present disclosure have the beneficial effects of addressing impacts of a new frame structure and the LBT procedure on the transmission of an original timing relationship, improving a transmission probability and feedback flexibility of the HARQ-ACK and effectively improving system performance.

What is claimed is:

1. A Hybrid Automatic Repeat reQuest-Acknowledgement (HARQ-ACK) information transmission method, comprising:
  determining the HARQ-ACK information to be transmitted and a resource location on an unlicensed carrier for transmitting the HARQ-ACK information according to a predefinition or a signaling indication;
  performing a listen before talk (LBT) procedure on the unlicensed carrier; and
  transmitting the HARQ-ACK information on the resource location after the LBT procedure is successfully performed,
  wherein the signaling indication comprises at least one of:
  a carrier indication for feeding back the HARQ-ACK information; a frequency domain resource location for transmitting the HARQ-ACK information;
  a sub-frame position or a sub-frame set for feeding back an acknowledgement or a non-acknowledgement (ACK/NACK);
  a process number or a process group number of the HARQ of a physical downlink shared channel (PDSCH) that requires feedback of the ACK/NACK;
  a signaling indication for indicating a capability of delaying sending the HARQ-ACK information;
  delay time for sending the HARQ-ACK information;
  a size of a predefined transmission window of the ACK/NACK;
  a size of a sliding window of the PDSCH in a plurality of transmission units corresponding to the feedback of the HARQ-ACK information, wherein the sliding window comprises a predetermined number of consecutive downlink transmission units with variable positions;
  a sliding granularity of the sliding window of the PDSCH in the plurality of transmission units corresponding to the feedback of the HARQ-ACK information; an adjustment size of the sliding window of the PDSCH in the plurality of transmission units corresponding to the feedback of the HARQ-ACK information; or a size of the HARQ-ACK information,
wherein when the HARQ-ACK information comprises an acknowledgement or a non-acknowledgement (ACK/NACK) corresponding to all transmission units of a physical downlink shared channel (PDSCH) in a time window, sliding a sliding window of a PDSCH corresponding to feedback of the HARQ-ACK information according to at least one of a sliding granularity indicated by the signaling, a granularity of one time window length, a granularity of one sliding window length, and a granularity of K transmission units, wherein K is a positive integer.

2. The method of claim 1, wherein the HARQ-ACK information comprises an acknowledgement or a non-acknowledgement (ACK/NACK) corresponding to at least one transmission unit, wherein the ACK/NACK corresponding to the at least one transmission unit comprises:
an ACK/NACK corresponding to all transmission units of the PDSCH that satisfies a predefined timing relationship in a time period from a last feedback time of an ACK/NACK corresponding to a transmission unit of a PDSCH to a current feedback time.

3. The method of claim 2, wherein the transmission unit comprises one of:
at least one sub-frame, at least one time slot, or at least one orthogonal frequency division multiplexing symbol.

4. The method of claim 2, wherein the predefined timing relationship is that a time difference between a transmission unit of a PDSCH and a location for transmitting the ACK/NACK is greater than or equal to N transmission units, wherein N is a positive integer.

5. The method of claim 1, wherein the determining the HARQ-ACK information to be transmitted and the resource location for transmitting the HARQ-ACK information according to the signaling indication comprises:
obtaining a signaling indication carried in a received radio resource control (RRC) message and/or received downlink control information (DCI) signaling indication; and
determining the HARQ-ACK information to be transmitted and the resource location for transmitting the HARQ-ACK information according to the obtained signaling indication.

6. The method of claim 5, wherein the obtaining signaling indication carried in the received DCI indication signaling comprises:
obtaining signaling indication carried in the received DCI signaling indication, wherein the DCI signaling indication comprises at least one of a downlink grant, a public information indication, an uplink grant, or a group-user equipment indication.

7. The method of claim 1, wherein a time domain resource location for transmitting the HARQ-ACK information comprises one of:
a location of a first uplink transmission unit after a downlink burst;
a location indicated by the signaling;
a location determined by adding Q transmission units to a location of a transmission unit of a last physical downlink shared channel (PDSCH), wherein Q is a predefined value or a value configured by the signaling; or
a location determined by adding the Q transmission units to a location of a last transmission unit in a sliding window of the PDSCH, wherein Q is the predefined value or the value configured by the signaling.

8. The method of claim 1, wherein a frequency domain resource location for transmitting the HARQ-ACK information is determined by at least one of:
determining, according to a physical resource block location indicated by the signaling, a frequency domain resource location for transmitting the HARQ-ACK information;
determining, according to a relationship between an interleaving unit and a control channel element (CCE) index of a control channel corresponding to a physical downlink shared channel (PDSCH), the frequency domain resource location for transmitting the HARQ-ACK information; or
determining, according to a transmit power control (TPC) command or allocated resource index (ARI) signaling in downlink control information (DCI) of a secondary cell (Scell), the frequency domain resource for transmitting the HARQ-ACK information after a frequency domain resource set configured semi-statically by higher layer signaling is determined.

9. The method of claim 8, wherein physical resource blocks included in the interleaving unit are uniformly and discretely distributed within a system bandwidth; and/or the same interleaving unit is code-division or time-division multiplexed by different user equipments (UEs).

10. The method of claim 1, wherein when the HARQ-ACK information comprises HARQ-ACK information corresponding to a plurality of transmission units on one carrier, the HARQ-ACK information is determined by at least one of:
a size of a sliding window of a physical downlink shared channel (PDSCH) in a plurality of transmission units corresponding to feedback of the HARQ-ACK information;
a number of PDSCHs corresponding to a user equipment (UE) received in the sliding window of the PDSCH in the plurality of transmission units corresponding to the feedback of the HARQ-ACK information;
a value of a last downlink assignment index (DAI) received in the sliding window of the PDSCH in the plurality of transmission units corresponding to the feedback of the HARQ-ACK information;
a value of a last DAI received;
a number of PDSCHs corresponding to the UE and being included in a previous downlink burst; or
a size of the HARQ-ACK information indicated by the signaling.

11. The method of claim 1, wherein when the HARQ-ACK information comprises HARQ-ACK information of all carriers in an uplink control information cell group, the transmitting the HARQ-ACK information on the resource location comprises:
concatenating HARQ-ACK information of all the carriers in a predetermined order; and
transmitting the concatenated HARQ-ACK information of all the carriers on the resource location.

12. The method of claim 1, wherein the transmitting the HARQ-ACK information on the resource location comprises:
transmitting, on the resource location, the HARQ-ACK information and at least one of: process number information of a physical downlink shared channel (PDSCH) corresponding to the HARQ-ACK information, and offset information of one of a predetermined time domain resource location and a time domain resource location indicated by the signaling from the resource location.

13. The method of claim 1, wherein the determining the resource location for transmitting the HARQ-ACK information according to the signaling indication comprises:

determining the resource location for transmitting the HARQ-ACK information via a first signaling and a second signaling;

wherein the first signaling is used for indicating at least one of: scheduling information for transmitting the HARQ-ACK information, a size of a frequency domain resource, a window size of a physical downlink shared channel (PDSCH) that requires feedback, or a size of an acknowledgment or a non-acknowledgment (ACK/NACK); and the second signaling is used for indicating a time domain location and/or a resource location of a physical resource block for transmitting the HARQ-ACK information.

14. The method of claim 1, after the performing the LBT procedure on the unlicensed carrier, the method further comprises:

transmitting the HARQ-ACK information by using a nearest transmission unit on a licensed carrier included in a predetermined cell group or abandoning transmission of the HARQ-ACK information when the LBT procedure is unsuccessfully performed on one of a predefined location on the unlicensed carrier and a feedback location indicated by the signaling on the unlicensed carrier; or feeding back failure information of the LTB procedure on a predefined licensed carrier when the LBT procedure is unsuccessfully performed on one of the predefined location on the unlicensed carrier and the feedback location indicated by the signaling on the unlicensed carrier and when all the HARQ-ACK information is acknowledgement (ACK) information or an amount of the ACK information in the HARQ-ACK information exceeds a threshold.

15. The method of claim 14, wherein the transmitting the HARQ-ACK information by using the nearest transmission unit on the licensed carrier included in the predetermined cell group comprises:

transmitting the HARQ-ACK information by using a nearest transmission unit periodically reserved on the licensed carrier included in the predetermined cell group.

16. A non-transitory storage medium, comprising a program stored in the storage medium, wherein when executed, the program executes the method of claim 1.

17. A processor for executing a program, wherein when executed, the program executes the method of claim 1.

* * * * *